United States Patent [19]

Evans

[11] 3,971,325

[45] July 27, 1976

[54] VEHICLE CONVEYOR

[76] Inventor: Lyle B. Evans, 3520 SW. 108th Ave., Beaverton, Oreg. 97005

[22] Filed: Feb. 28, 1975

[21] Appl. No.: 554,204

[52] U.S. Cl. .............................. 104/172 B; 198/171
[51] Int. Cl.² ............................................ B61B 13/12
[58] Field of Search ........ 104/172 R, 172 B, 172 C, 104/162, 178; 198/171, 170, 168; 308/3 R; 214/16.1 DC

[56] References Cited
UNITED STATES PATENTS

| | | | |
|---|---|---|---|
| 2,893,535 | 7/1959 | Kay | 104/172 R X |
| 3,568,606 | 3/1971 | Grant | 104/172 B |
| 3,719,151 | 3/1973 | Andersen | 104/172 B |
| 3,744,433 | 7/1973 | Bernardi | 104/172 B |
| 3,745,932 | 7/1973 | Czerwinski | 104/172 B |
| 3,782,790 | 1/1974 | Benkowski | 308/3 R |
| 3,815,512 | 6/1974 | Balas | 104/172 B |
| 3,832,953 | 9/1974 | Aaron | 104/162 |
| 3,885,837 | 5/1975 | Mellor | 308/3 R |

Primary Examiner—Robert J. Spar
Assistant Examiner—Randolph A. Reese
Attorney, Agent, or Firm—James D. Givnan, Jr.

[57] ABSTRACT

A conveyor for advancing a vehicle along a desired path by means of a wheel contacting pusher assembly. The conveyor base is adapted for placement on an unaltered concrete floor with abutting conveyor base sections, variable in number, being joined at the installation site to provide the necessary length. A continuous chain is confined within upwardly opening guideways with each pusher assembly coupled to a chain component in a manner permitting upward displacement of the pusher assembly about an axis parallel to the chain centerline. Replaceable wear components are associated with the guideways and each pusher assembly. Each assembly includes leading and trailing rollers imparting operational loads to the conveyor base while an intermediate raised roller bears against the vehicle rotating wheel.

5 Claims, 5 Drawing Figures

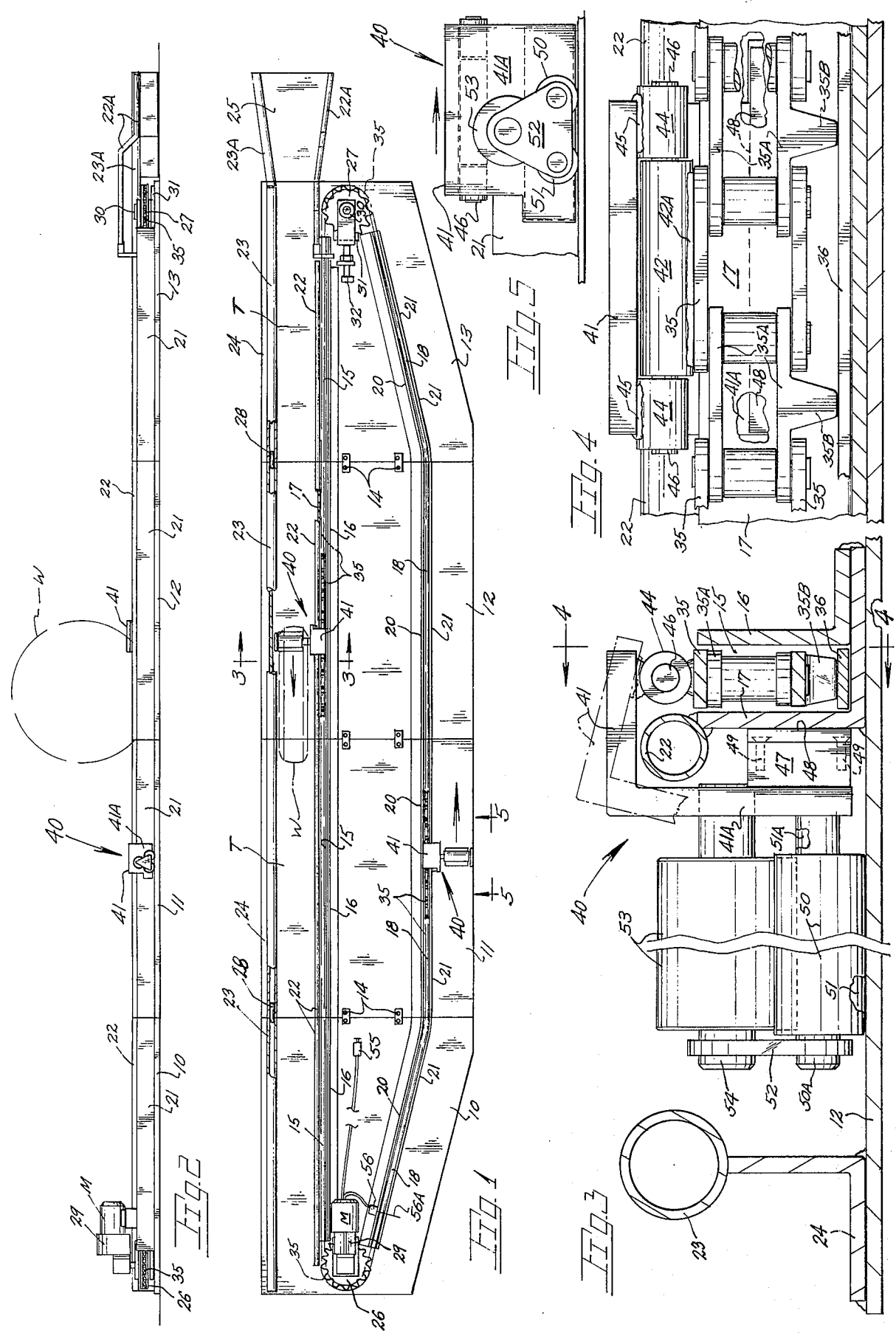

VEHICLE CONVEYOR

BACKGROUND OF THE INVENTION

The present invention is embodied within a conveyor for moving driverless vehicles along a course such as through an automobile washing apparatus.

Presently known in the vehicle conveyor field are several types of conveyors for moving a vehicle along past car washing equipment. Generally speaking, such conveyors are of complex, costly construction and represent a substantial portion of the overall cost of a car wash installation. Such know conveyors, in addition to being complex, commonly require the site to be extensively modified prior to installation of the conveyor system. Subsequent to extensive modification of the floor site to receive the conveyor system, considerable installation work is incurred in setting up of the conveyor and when so installed must be considered a permanent installation. In the installation of certain known conveyors the floor must be of a specific configuration with the installation of concrete forms followed by a concrete pouring operation and lastly the installation of the conveyor. Should the site be later desired for use other than as a car wash installation the modification effort is lost with additional effort required to return the floor to its original state. Also objectionable with known conveyors is their use of complex components which incur high original cost and subsequent costly maintenance and replacement. Additionally found undesirable with known units is the risk car wash attendants are subjected to by coming into contact with exposed chain and other moving components.

Previous efforts to provide a vertically displaceable, tire contacting roller have been made such as that disclosed in U.S. Pat. No. 3,719,151. The roller shown therein is in cantilevered relationship with offset, multiple rollers engaging complex track structure in place within a specifically contoured floor surface and accordingly, does not achieve the objectives of the present conveyor.

SUMMARY OF THE INVENTION

The present invention is embodied within a vehicle conveyor having moving components engageable with a vehicle wheel to urge same and the vehicle along a desired path. The conveyor is adapted for placement on a supporting surface with no alteration of the floor surface being required.

The conveyor is desirably of a segmented nature having base sections for securement to one another at the operating site to affect several advantages. Further, the segmented feature permits plant fabrication in an efficient production manner. Assembly at the location of use is accomplished in a rapid manner. The base sections may be of open construction affecting a saving of both materials and weight, the latter facilitating savings in shipping to the installation site. In place on each of the base segments are lengths of chain guideways each defining an upwardly opening passageway within which travels a continuous roller chain imparting movement to a wheel engaging pusher assemblies. Said chain rides on a wear strip also confined within the passageway. Pusher assembly components are adapted for upward movement about a horizontal axis of pivot means attaching the pusher assembly to the chain to permit the assembly to ride over obstacles. A replaceable wear strip distributes loads imparted thereto to a wall of the chain guide. Included within the pusher assembly are leading and trailing rollers which distribute vehicle imparted loads to a supporting surface while a superjacent roller rotates with the vehicle wheel.

Important objectives of the invention include the provision of: a wheel engaging vehicle conveyor particularly suited for placement on an existing floor surface with no alteration of the latter being required; a conveyor of a segmented nature for fabrication in a plant by efficient methods and permitting low cost shipping and rapid set up at the site of use; a conveyor having wear strips supporting a continuous chain the wear strips being replaceable; a conveyor having a pusher assembly including large surface area rollers distributing operational loads to the conveyor base with the rollers adapted for upward displacement upon encountering an obstruction, and; a conveyor wherein a pusher assembly includes replaceable friction reducing means in load distributing contact with a chain guide.

BRIEF DESCRIPTION OF THE DRAWING

In the accompanying drawing:

FIG. 1 is a plan view of the present conveyor with chain fragments broken away for purposes of illustration, FIG. 2 is a side elevational view of the conveyor shown in FIG. 1, FIG. 3 is a sectional elevational view of the pusher assembly taken along line 3—3 of FIG. 1, FIG. 4 is an elevational view of a pusher assembly taken along line 4—4 of FIG. 3 with associated chain components, and FIG. 5 is a side elevational view of a pusher assembly taken along line 5—5 of FIG. 1.

DESCRIPTION OF THE PREFERRED EMBODIMENT

With continuing reference to the accompanying drawing wherein applied reference numerals indicate parts similarly identified in the following specification, the reference numerals 10, 11, 12 and 13 all identify base sections suitably joined by cooperating fasteners as at 14 to constitute an assembled base. The base sections are of plate steel with sections 10 and 13 constituting end sections while sections 11 and 12 may be termed intermediate sections the number of which may vary to provide the necessary conveyor length. The fastening means 14 may comprise threaded type fastening elements or may simply be welds located at points along abutting section edges. Each of said sections supports length of communicating chain guideways 15 of upright channel configuration which may be formed by angle iron members typically shown at 16 and 17 in FIG. 3 in superimposed, welded securement to one another. Guideway 15 is hereinafter referred to as the advance guideway while conversely a second guideway at 18 may be termed a return guideway. Return guideway 18 may be of like construction with superimposed angle iron sections 20 and 21 welded to one another and to their respective base sections. For clearance with associated equipment not shown return guideway 18 is offset from advance channel 15.

Affixed to angle iron member 17 is a tubular element 22 extending lengthwise of the drive channel to provide a tire guide with said guide extending past the outer ends of the angle iron sections to protect later described sprockets. A cooperating tire guide is provided by a second tubular element at 23 welded in place to base mounted sections of angle iron 24 to jointly define wheel guide means extending the combined length of the base sections. Alignment means in the form of connector pins 28 assure proper section alignment. At the on-loading or right hand end of FIG. 1 a wheel guide structure 25 includes converging tire guides 22A and 23A to facilitate entry of a vehicle wheel at W. A raised segment of guide 22A, at the on-loading end of the conveyor, permits passage of a pusher assembly 40 therebelow as it moves about an idler sprocket.

Disposed adjacent opposite ends of the conveyor base is a drive sprocket 26 and an idler sprocket 27. An electric motor at M powers drive sprocket 26 through a suitable reduction drive mechanism 29 or an equivalent roller chain sprocket drive affecting a speed reduction. Idler sprocket 27 is journalled within upper and lower bearings as at 30 carried by a U-shaped weldment the lower plate member of which is slidably mounted in a trackway 31 to permit adjustment of a roller chain 35 by screw means 32.

The continuous length of chain 35 is entrained about both sprockets and occupies advance guideway 15 and return guideway 18. Fragments of the chain are shown associated with later described pusher assemblies with remaining lengths of chain being shown in phantom lines only. As best viewed in FIG. 4, roller chain 35 includes conventional side plate components at 35A each having a depending projection 35B for sliding engagement along a replaceable guideway wear strip as at 36. Said wear strip is of a material having long wearing characteristics and if desired, a friction reducing capability.

Pusher assemblies for engagement with a vehicular wheel W are indicated generally at 40 with the following description being of one such assembly equally applicable to the remaining assemblies suitably spaced along chain 35. Each pusher assembly includes a main body 41 having an offset upper portion terminating above a segment of guideway confined roller chain with a hinge arrangement embodied within a tubular member 42 welded at 42A to an uppermost side plate of the chain. Collars at 44, secured to main body 41 by welds 45, may rotate about a common horizontal pivot pin axis 46 permitting momentary upward travel of main body 41 to circumvent obstructions. As best viewed in FIG. 3, a depending flange portion 41A of the base serves to mount a block 47 which in turn receives a friction reducing means shown as a plate 48 preferably of a synthetic resin polymer secured by fasteners 49. Said friction reducing plate rides in surfacial, load imparting contact with the outer wall of angle iron section 17 of the drive guideway.

Additionally carried by main body 41 of each pusher assembly are front and rear (with respect to direction of travel) load bearing rollers 50 and 51 each carried by a supporting shaft 50A and 51A interconnected at their outer end by a connector plate 52. A tire engaging roller 53 is carried on a shaft 54 fixedly mounted at its inner and outer ends on said main body and said connector plate. The last mentioned roller includes internal bearing means so as to freely rotate during contact with the rotating tire being pushed.

In operation, re-circulating chain 35 carries a pusher assembly 40 about idler 27 into rearward engagement with vehicle wheel W of a vehicle momentarily stopped with its forward wheel in place near the on-loading end of track T. Continued motion of the pusher assembly imparts forward motion to the wheel and vehicle to propel same toward the off-loading end of the conveyor which, for example, may be located at the exit of a car wash establishment. Washing instrumentalities are located along the vehicle path one such instrumentality being the car wash apparatus disclosed in my co-pending U.S. patent application Ser. No. 522,935 now U.S. Pat. No. 3,931,658 filed by the present inventor. For controlling motor operation, a switch at 55, preferably manually actuated by an operator, is provided with circuit closing contacts to energize motor M while a circuit interrupting switch at 56, including a feeler 56A contacted by a pusher assembly, serves to stop motor operation upon a vehicle being discharged from the conveyor.

With reference to chain 35, the same may include upwardly directed projections 35B on upper links 35A (other than those links closely associated with a pusher assembly) to enable inverting of the chain to thereby take advantage of increased chain life. Obviously tubular member 42 and its attached link component must be reorientated on the inverted chain in such instances. Replacement of wear strip 36 as well as plate 48 are required only after long periods of use particularly if such use is within a car wash establishment as water and cleaning agents serve to reduce friction.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A vehicle conveyor adapted for placement on a continuous floor surface for moving driverless vehicles along a desired path, said conveyor comprising, a base comprised of interconnected plate members for placement on the floor surface, an endless roller chain including upwardly disposed side components, said chain having runs lengthwise disposed on said base, upwardly opening chain guideways in place on said interconnected plate members of the base with each of said guideways in communication with a remaining guideway and confining said chain runs for advancement along a desired course, said guideways open at their upper extremeties, and pusher assemblies disposed at points along said chain, each independently engagable with the wheel of a vehicle and including, a main body including an upright portion and an upper offset portion, cooperating pivot means carried by said upper offset portion of the main body and the upper surface of an upwardly disposed side component of the chain permitting displacement of the pusher assembly body about a horizontal axis of the cooperating pivot means disposed parallel to and above the chain, and multiple rollers carried by said main body transferring vehicle imparted loads to said base, said multiple rollers also displaceable with said main body about said horizontal axis.

2. The vehicle conveyor as claimed in claim 1 wherein some of said chain guideways additionally function to support the main body of each pusher assembly against laterally directed loads.

3. The vehicle conveyor claimed in claim 2 additionally including friction reducing means interposed between said main body and the chain guideway.

4. The vehicle conveyor claimed in claim 3 wherein said offset upper portion of the main body of the pusher assembly terminates outwardly above the guideway.

5. The vehicle conveyor claimed in claim 1 wherein some of said guideways support lengthwise extending tubular elements for engagement with remaining tubular elements on adjacent guideways for conveyor alignment purposes.

* * * * *